United States Patent
Price et al.

(10) Patent No.: US 9,300,846 B2
(45) Date of Patent: Mar. 29, 2016

(54) SIGNAL SHAPING FOR IMPROVED MOBILE VIDEO COMMUNICATION

(71) Applicants: Douglas Price, San Jose, CA (US); Xiaosong Zhou, Campbell, CA (US); Hsi-Jung Wu, San Jose, CA (US)

(72) Inventors: Douglas Price, San Jose, CA (US); Xiaosong Zhou, Campbell, CA (US); Hsi-Jung Wu, San Jose, CA (US)

(73) Assignee: Apple Inc., Cupertino, CA (US)

(*) Notice: Subject to any disclaimer, the term of this patent is extended or adjusted under 35 U.S.C. 154(b) by 521 days.

(21) Appl. No.: 13/745,256

(22) Filed: Jan. 18, 2013

(65) Prior Publication Data

US 2014/0071309 A1    Mar. 13, 2014

Related U.S. Application Data

(60) Provisional application No. 61/699,149, filed on Sep. 10, 2012.

(51) Int. Cl.
| | |
|---|---|
| *H04N 5/217* | (2011.01) |
| *H04N 5/213* | (2006.01) |
| *H04N 5/21* | (2006.01) |

(52) U.S. Cl.
CPC ............. *H04N 5/217* (2013.01); *H04N 5/213* (2013.01); *H04N 5/21* (2013.01)

(58) Field of Classification Search
None
See application file for complete search history.

(56) References Cited

U.S. PATENT DOCUMENTS

| | | | |
|---|---|---|---|
| 7,983,510 B2* | 7/2011 | Hsieh et al. | 382/275 |
| 8,204,334 B2* | 6/2012 | Bhagavathy et al. | 382/261 |
| 8,417,047 B2* | 4/2013 | Chatterjee et al. | 382/254 |
| 8,447,130 B2* | 5/2013 | Chiu | 382/261 |
| 8,553,783 B2* | 10/2013 | Deng et al. | 375/240.27 |
| 8,872,977 B2* | 10/2014 | Chiu | 348/607 |
| 2006/0274962 A1* | 12/2006 | Chiu | 382/275 |
| 2007/0071343 A1* | 3/2007 | Zipnick et al. | 382/254 |
| 2009/0052797 A1* | 2/2009 | Matsushita et al. | 382/260 |
| 2009/0167951 A1 | 7/2009 | Chiu | |
| 2009/0278988 A1 | 11/2009 | Bhagavathy et al. | |
| 2010/0165207 A1 | 7/2010 | Deng et al. | |
| 2011/0052065 A1* | 3/2011 | Nepomniachtchi et al. | 382/186 |
| 2011/0052095 A1* | 3/2011 | Deever | 382/300 |
| 2011/0091101 A1* | 4/2011 | Cote et al. | 382/167 |
| 2011/0176059 A1 | 7/2011 | Chiu | |
| 2012/0154642 A1* | 6/2012 | Ichikawa et al. | 348/241 |
| 2012/0224789 A1 | 9/2012 | Chatterjee et al. | |

* cited by examiner

*Primary Examiner* — Jay Patel
*Assistant Examiner* — Reza Aghevli
(74) *Attorney, Agent, or Firm* — Kenyon & Kenyon LLP

(57) ABSTRACT

In certain low-light or other poor image capture conditions, the camera capture settings may create noise fitting a known profile, including certain specific color ranges and signal frequencies, in the captured image. A pre-processor may identify frequency bands and DC offsets that may indicate noise in an image captured with known settings. Then the areas of the image containing the identified frequencies and offsets may be analyzed spatially and temporally to confirm that the identified regions are noise and not part of the scene and an appropriate filter defined.

40 Claims, 4 Drawing Sheets

200

300

400

SIGNAL SHAPING FOR IMPROVED MOBILE VIDEO COMMUNICATION

CROSS-REFERENCE TO RELATED APPLICATION

This application claims the benefit of priority afforded by provisional application Ser. No. 61/699,149, filed Sep. 10, 2012, entitled "Signal Shaping for Improved Mobile Video Communication."

BACKGROUND

In video coding systems, a conventional encoder may code a source video sequence into a coded representation that has a smaller bit rate than does the source video and, thereby achieve data compression. A decoder may then invert the coding processes performed by the encoder to retrieve the source video.

To improve the quality of a video signal, the signal may be filtered to reduce noise. The signal may be both spatially and temporally filtered. Spatial filters reduce or filter noise in a single captured frame by averaging the signals representing the captured frame to cut off outlying signals that likely represent noise. The spatial filter is conventionally implemented with a low pass filter. Temporal filters reduce or filter noise across multiple frames representing images captured over time. Then, for frames depicting the same scene, the difference between the frames may represent noise. The temporal filter identifies these differences and reduces the identified noise throughout the sequence of frames. Then the SNR will improve over time as the spatial filter uses the scene history to improve filtering operations. A noticeable artifact in an image may be the result of strong temporal based filtering causing ghosting, the result of motion blur, or may just be distortion caused by noise.

Some camera capture processes may result in noise of a specific profile. For example, in low light, a captured image may have a specific noise profile that is manifested in noise having a particular variance, color, saturation, brightness, color-shift, or other identifiable characteristics. However, this noise may be difficult to remove with traditional filters as noise of specific colors may be identified as objects in the image or objects may be identified as noise.

Accordingly, there is a need in the art for systems and methods to identify and minimize noise in images captured during disadvantageous lighting conditions.

DETAILED DESCRIPTION

Figure 1:
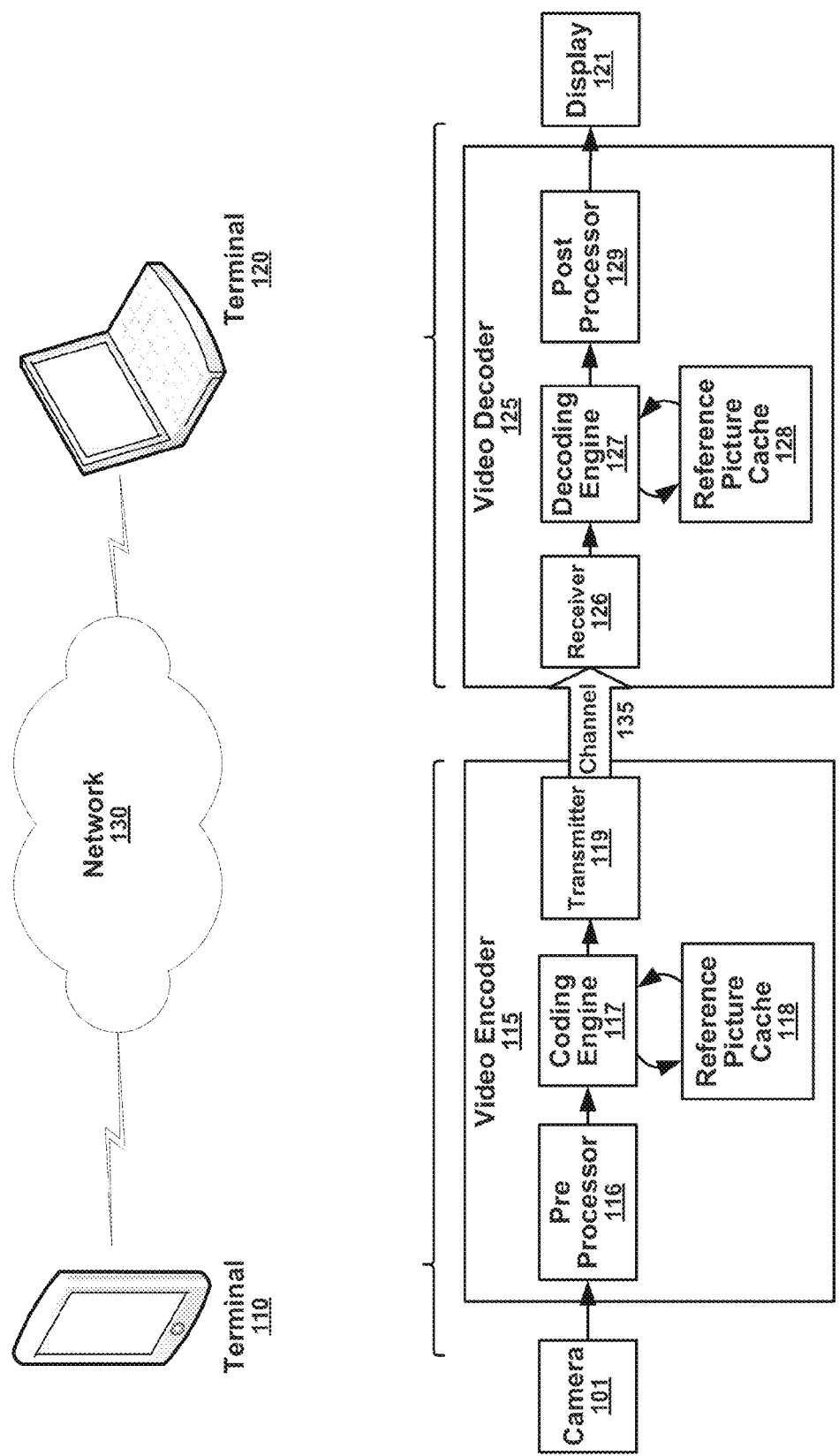
FIG. 1 is a simplified block diagram of an exemplary video coder/decoder system suitable for use with the present invention.

A spatio-temporal filtering algorithm is described that is pixel-wise adaptive, patch-based adaptive, signal-to-noise ratio adaptive and camera-motion adaptive and may correctly distinguish moving scene elements from stationary elements in order to distinguish noise from the rest of the scene. Furthermore, techniques to identify and reduce specific types of camera noise using camera and scene specific statistics to estimate and reshape the original signal are provided.

The pixel-adaptive method involves adapting pixel based filtering based on the luminance differences between the pixel and it's spatial and temporal neighbors. In the temporal case, a window can be used to calculate the closeness of the pixels and allow filtering to occur when pixel differences are a result of noise.

Patch based filtering can then be applied to modulate pixel-based filtering in order to correctly distinguish when patches have similar underlying signals and only differ by noise. Patch based estimates can include variance, edge metrics, pixel similarity metrics, complexity metrics, luma and chroma mean differences and others to determine similarity of patches. Patches can then be modified based on neighboring patch information or camera specific information to adapt to things such as the effects of lens-shading on noise. When two pixels are filtered, their corresponding patches are then analyzed to determine how to modulate the strength and adaptivity of the per-pixel filtering. According to an embodiment, a ratio of variances between patches may be calculated and multiplied by a combination of luma and chroma mean differences, and then the neighbor similarity used to estimate the patch similarity.

Camera motion based techniques can also be used. Gyroscope and accelerometer information may be combined to determine when the camera is in motion and to identify an accurate amount of pixel shift from small camera translations or rotation. Estimated shifts can be applied to previous temporal frames in order to align temporal filtering and achieve better results. Camera motion may also be used to adapt the strength of temporal and spatial filtering.

Based on particulars of the camera capture process, noise can also have a particular set of statistics that differentiates it from other parts of the scene. These statistics can include a particular noise variance, color, saturation, brightness, color-shift, or other characteristics which can assist both in identifying noisy pixels but also in determining how to shape the noisy signal to appear more natural. This can even be done in the presence of large amounts of noise in which the magnitude of the signal is not much higher than the magnitude of the noise.

When noise takes a specific and identifiable shape which can be easily distinguished from other parts of the signal, the signal may be shaped to limit the noise. This can be determined through ISP readings such as white-balance, exposure and signal-to-noise ratio as well as image analysis. Some types of noise are very common such as the noise having a particular hue, saturation, and variance under particular lighting, exposure, and white-balance. Once identified, these types of noise can be targeted and the corresponding signal can be shaped through techniques such as targeted desaturation. Targeted desaturation can be performed via a band pass filter, which may be applied such that only a specific spatial frequency and color (hue) is filtered from the image signal. It can also be limited to specific areas of the scene, based on image analysis.

FIG. 1 is a simplified block diagram of a video coder/decoder system 100 suitable for use with the present invention. The video coder/decoder system 100 may include terminals 110, 120 that communicate via a network 130. The terminals 110, 120 each may capture video data locally and code the video data for transmission to another terminal via the network 130. Each terminal 110, 120 may receive the coded video data of the other terminal from the network 130, decode the coded data and display the recovered video data. Video terminals 110, 120 may include personal computers (both desktop and laptop computers), tablet computers, hand-held computing devices, computer servers, media players and/or dedicated video conferencing equipment.

A video coder/decoder system 100 may include an encoder system 115 that may accept a source video sequence into pre-processor 116, and may code the source video as coded video in coding engine 117, which typically has a much lower bit rate than the source video. Coding engine 117 may use reference picture cache 118 for storing temporary frame data. The camera 101, may send data to pre-processor 116 related to the configuration or settings used when pictures or video are taken. The camera may send, for example, data related to white balance, lighting conditions, exposure, signal to noise ratio, gyroscopes or accelerometers.

The encoder system 115, in one embodiment, may utilize camera settings to recognize noise in images. The encoder may temporally and spatially filter the noise by recognizing noise profiles. The encoder may use a pixel as well as a patch based filter to accurately define and correct the noise type.

A video coder/decoder system 100 may include a channel 135 that delivers the coded video data output from the coding engine 117 to the decoder 125. The encoder system 115 may output the coded video data via transmitter 119 to the channel 135, which may be a storage device, such as an optical, magnetic or electrical storage device, or a communication channel formed by computer network or a communication network for example either a wired or wireless network.

A video coder/decoder system 100 may include a decoder system 125 that may retrieve the coded video data from the channel 135 in receiver 126. The decoder system 125 may use reference picture cache 128 for storing temporary frame data while decoding. The decoder system 125 may invert the coding operations performed by the encoder system in decoding engine 127 and output decoded video data to an associated display device 121, after being processed in post processor 129. The decoding engine 127 in another embodiment, may also filter and recognize noise profiles and types as in the encoder.

As shown the video coder/decoder system 100 supports video coding and decoding in one direction only. For bidirectional communication, an encoder and decoder may each be implemented at each terminal 110, 120 such that each terminal may capture video data at a local location and code the video data for transmission to the other terminal via the network. Each terminal may receive the coded video data of the other terminal from the network, decode the coded data and display video data recovered therefrom.

An encoder 115 may receive video data captured from a camera 101. The camera 101 has a sensor that captures the desired image but may also include some background noise in the captured analog signal. Many situations may increase the prevalence of noise in a captured image including for example in camera capture settings having low light, when the analog gain of the digital to analog converter is high, when a small aperture is used to capture the image, if the sensor is slow or of low quality, etc. For example, the Signal to Noise Ratio (SNR) of a captured image may vary based on the lighting available when capturing the image. In bright conditions with a lot of light, the SNR may be high. However, with dim or low lighting conditions, the captured image may have more noise and therefore a smaller SNR.

Figure 2:
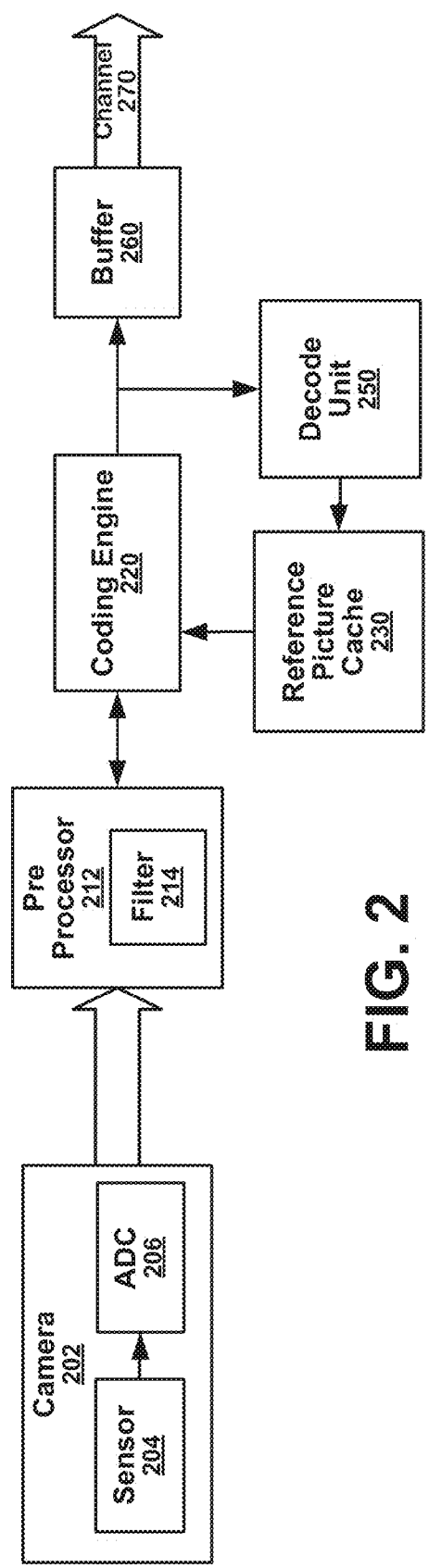
FIG. 2 is a simplified block diagram of an exemplary conventional video coding system according to an embodiment of the present invention.

FIG. 2 is a simplified block diagram of an exemplary video coding system 200 according to an embodiment of the present invention. The system 200 may include a camera 202 that captures image or video data. The camera may include an image sensor 204 to capture an optical image. The sensor interprets the image as an analog signal. An analog-to-digital converter 206 (ADC) may convert the analog signal from the sensor into a digital signal. The digital signal may then be transmitted to a signal processor for additional processing and display. The sensor and ADC may be implemented together as part of the camera as a single application specific integrated circuit (ASIC).

The system may include a pre-processor 212 that receives a sequence of source video data and performs pre-processing operations that condition the source video for subsequent coding. Video pre-processing may be performed upon source video data to render video coding more efficient including by performing video processing operations on video frames through filter 214 such as de-noising filtering, bilateral filtering or other kinds of processing operations that improve efficiency of coding operations performed by the video coding system 200. The video pre-processor 212 may further identify a noise profile for the captured image and perform noise filtering in an attempt to eliminate noise distortion that may be present in the source video sequence. The pre-processor 212 may recognize noise variance, color, saturation, brightness or color-shift characteristics that may help in identifying noise in a signal and classifying it. The pre-processor 212 in one embodiment may use a plurality of filters including a spatial and temporal filter. The pre-processor 212 may use finite impulse response and infinite impulse response filters, as well as luminance or chrominance based neighbor differencing.

The system 200 may also include an encoding engine 220 that codes processed frames according to a variety of coding modes to achieve bandwidth compression. The coding engine 220 may select from a variety of coding modes to code the video data, where each different coding mode yields a different level of compression, depending upon the content of the source video. The encoding engine 220 may code the processed source video according to a predetermined multi-stage coding protocol. For example, common coding engines parse source video frames according to regular arrays of pixel data (e.g., 8×8 or 16×16 blocks), called "pixel blocks" herein, and may code the pixel blocks according to block prediction and calculation of prediction residuals, quantization and entropy coding. The video coding engine may code the processed source video according to a known protocol such as H.263, H.264, MPEG-2 or MPEG-7. Such video coding processes typically involve content prediction, residual computation, coefficient transforms, quantization and entropy coding.

The system may also include a video decoding engine unit 250 that decodes coded video data generated by the encoding engine 220. The decoding engine unit 250 may generate the same decoded replica of the source video data that a decoder system will generate, which can be used as a basis for predictive coding techniques performed by the encoding engine. The decoding engine may access a reference frame cache 230 to store frame data that may represent sources of prediction for later-received frames input to the video coding system. Both the encoder system and decoder system may keep reference frames in a reference frame cache. However, due to constraints in cache sizes, a limited number of reference frames can be stored in the cache 230. The system may also include a buffer 260 to store the coded data to be delivered by a transmission channel 270 to a decoder system or terminal such as 110, 120.

Figure 3:
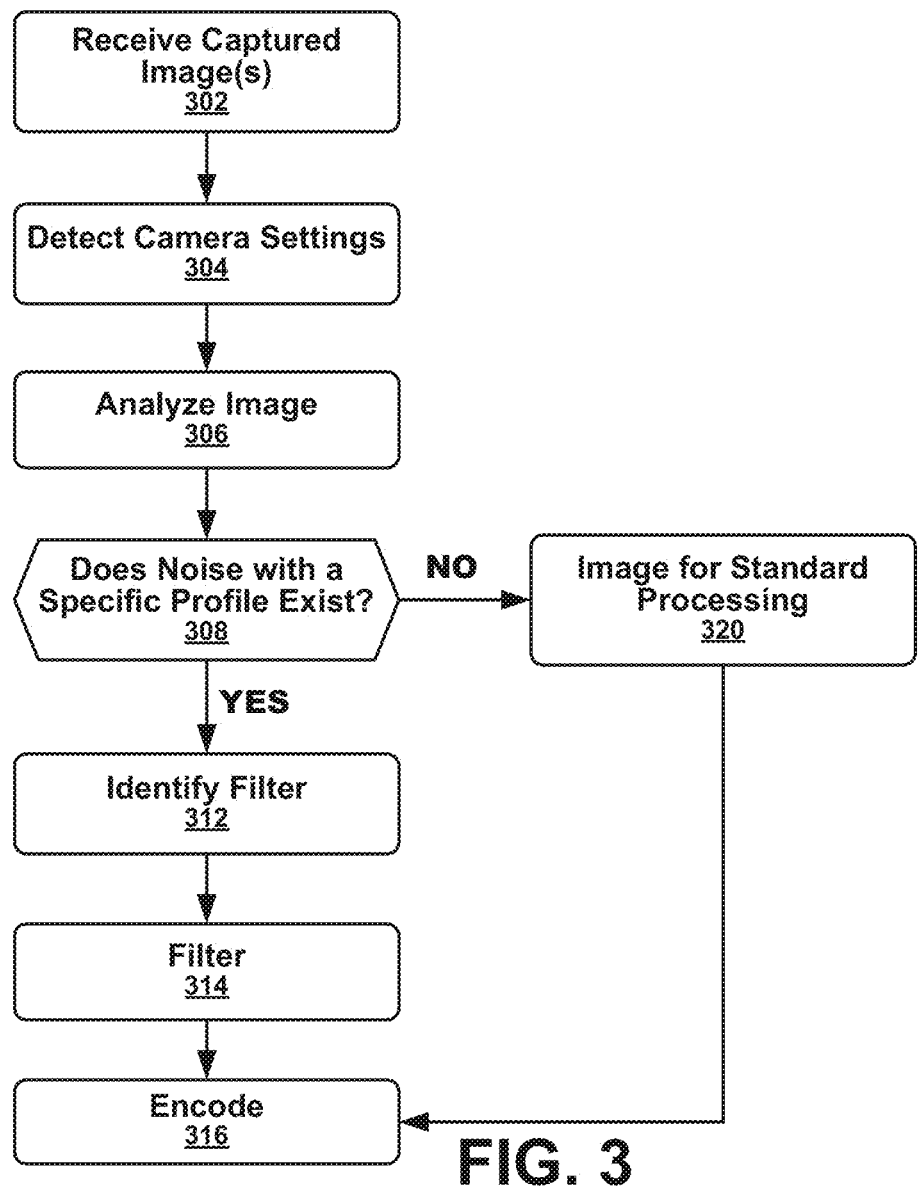
FIG. 3 is a simplified flow diagram illustrating an exemplary method for filtering a sequence of frames according to an embodiment of the present invention.

FIG. 3 is a simplified flow diagram illustrating an exemplary method 300 for filtering a sequence of frames according to an embodiment of the present invention. Source video may initially be received at a pre-processor (block 302). The pre-processor may detect camera settings for the received image (block 304). Settings such as lighting conditions and white balance may be detected by the pre-processor.

The detected settings may then be used to analyze the image (block 306). The analysis may identify potential regions of noise in the image and then verify that the image is noise and not part of the scene. The analysis may determine if noise with a specific profile exists (block 308). The noise may be identified, for example, using noise variance, color, saturation, brightness, color-shift or other like characteristics used in image analysis.

If a noise profile was identified during the analysis, an appropriate noise filter may be identified and targeted desaturation applied (block 312). The identified filter may then be applied to the image signal (block 314). The noise filter may be an IIR or FIR filter that may be applied to a portion of the image having identified noise. Similarly, a band pass filter may be applied such that only a specific frequency and color is filtered from the image signal.

If a specific noise profile was not identified during the analysis, a noise filter directed to a specific frequency or color may not be necessary and the image may undergo conventional processing and coding (block 320). The signal may then be encoded by a coding engine (block 316).

Figure 4:
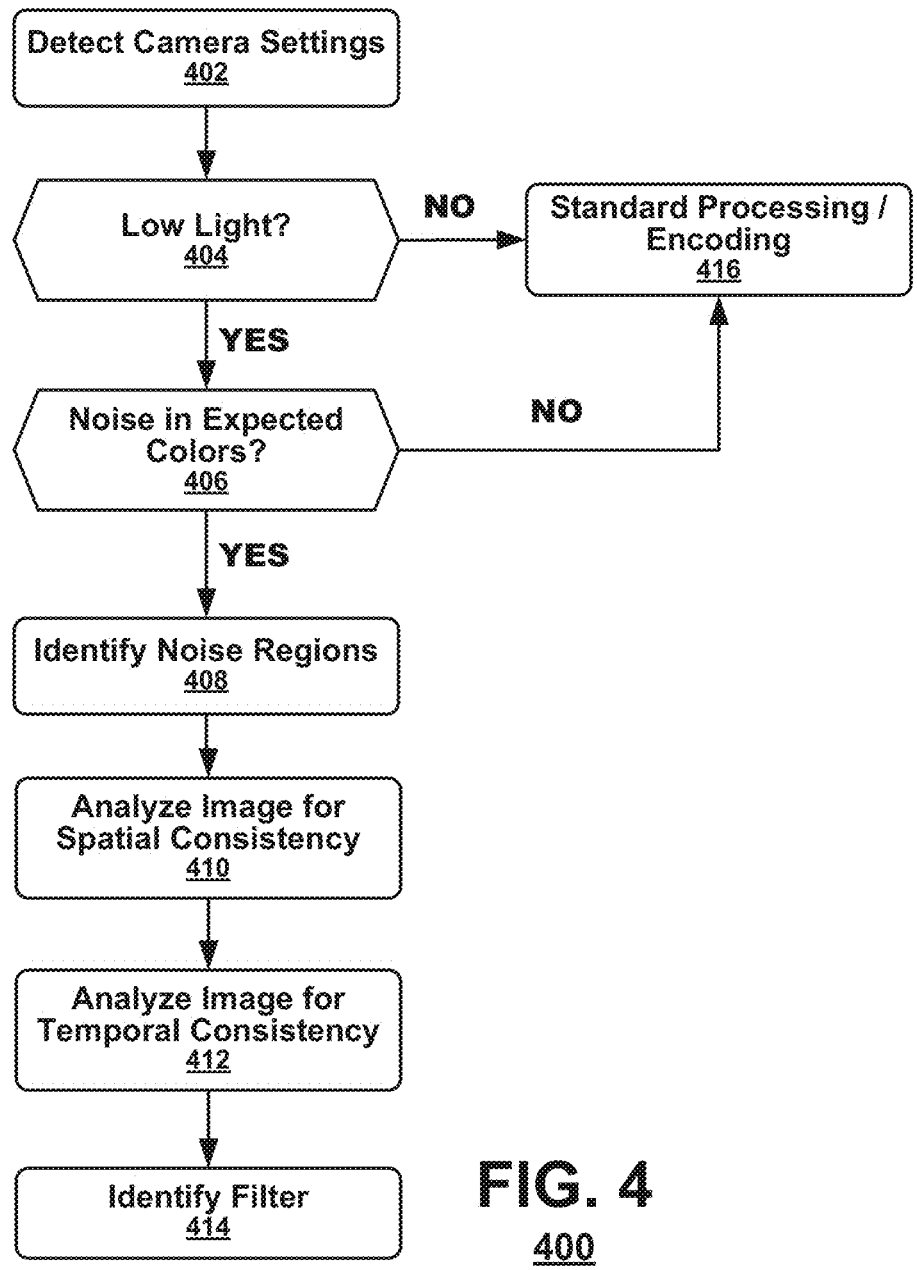
FIG. 4 is a simplified flow diagram illustrating an exemplary method for analyzing noise in an image according to an embodiment of the present invention.

FIG. 4 is a simplified flow diagram illustrating an exemplary method 400 for initially analyzing noise in an image according to an embodiment of the present invention. Camera settings may be identified for the image (block 402), including, for example, the lighting conditions and white balance algorithm implemented at the camera, in low-light conditions, the certain specific color ranges and signal frequencies may represent noise in the image. If the image was captured in low light, as part of the analysis, the pre-processor may identify frequency bands that may indicate noise (block 404). For example, noise may consist of higher frequencies whereas image objects may consist of lower frequencies.

If the image was captured in low light, and the expected frequencies are identified in the signal (block 406), the pre-processor may identify DC offsets for expected color ranges that may indicate noise. For example, in low-light settings, the captured image may typically exhibit noise as blue or yellow.

If no such frequencies or DC offsets exist in the image, then there may not be any noise related to the specific low-light profile and no filter may be identified (block 416). However, if the identified frequencies and offsets indicate noise exists in the image, the areas of the image containing the identified frequencies and offsets may be analyzed spatially and temporally to confirm that the identified regions are noise and not part of the scene (block 408).

The image may be analyzed spatially by examining pixels or blocks in the regions identified (block 410) and comparing the identified pixels to the neighboring pixels or blocks as potentially having noise to determine whether the color is consistent across the scene. Color localized in one area may be considered to be an object and not noise. Additionally, edge detection may facilitate the identification of objects and noise.

The image may be analyzed temporally (block 412) by examining previously received frames. Identified color that is consistently placed through multiple frames may be considered to be an object. Additionally, edge detection may facilitate the identification of objects and noise. Based on the spatial and temporal analysis and the camera capture statistics, an appropriate noise filter may be identified (block 414).

Other camera and image analysis may be used to inform the filtering decision. For example, as part of the analysis, SNR may be considered in indentifying whether the image contains the expected noise. Additionally noise may be identified, for example, using color, saturation, brightness, color-shift or other characteristics.

Gyroscope and accelerometer information from the camera may be used to identify temporally consistent objects. A frame may first be adjusted according to a pixel shift to account for the indicated translation and rotation and then the adjusted frame may be more accurately compared to earlier frames.

Blocks of pixels in an image may be analyzed to identify variance, edge metrics, pixel similarity metrics, complexity metrics, luma and chroma mean differences and others to determine spatial similarity of blocks.

Detected motion for a sequence of frames may be used to adjust the strength of the identified filters. For example, as detected motion increases, the weight given to the temporal filtering considerations may be limited. Then for high motion frames, little to no temporal filtering may be applied.

Object recognition techniques may additionally be used to identify an appropriate filter for the signal. For example, facial recognition may be used to identify specific objects in an image. For areas of a frame that represent a face, the temporal filtering may be restricted or turned off.

As previously noted, portions of a frame may be filtered differently than other portions. For cameras with lenses that may have lens shading issues, the corners of the frame may receive specialized processing. As the corners may be captured with less light, a higher and wider band of frequencies may be considered as potentially containing noise.

As a camera-specific example, when signal-to-noise ratio is less than 20 and the ISP indicates a color-temperature greater than 2500 Kelvin, a yellow-ish noise in the CIE 1931 chromaticity space of $x>0.4$ and $0.3<y<0.5$ can be assumed. An analysis can be done on values in that part of the color spectrum that are also contained within spatial frequencies between $pi/2$ and $pi$ (indicating medium to high range spatial frequencies). Image areas with a high magnitude of the spatial frequency-response in that frequency band and in that part of the color-spectrum should be considered for desaturation. The definition of a "high-magnitude" will be dependent on the camera's signal-to-noise ratio reading, as high-magnitude noise will be more common under low SNR scenarios.

Areas of the image will not be desaturated if they also contain high-magnitude low spatial-frequencies in the same area of the color-spectrum (yellow-ish) or if the area has lower spatial-variance than average (indicating that the yellow color was actually present in the scene and is not noise). In this way we can avoid desaturating correct yellow colors while performing a strong targeted desaturation of yellow noise when the camera gives us indications that the noise will be that color and contain that range of spatial frequencies.

As discussed above, the foregoing embodiments provide a coding system that uses camera settings and statistics to identify and filter noise in a captured image associated with the camera capture settings. The techniques described above find application in both hardware- and software-based encoder. In a hardware-based encoder the functional units may be provided in a dedicated circuit system such as a digital signal processor or field programmable logic array or by a general purpose processor. In a software-based encoder, the functional units may be implemented on a personal computer system (commonly, a desktop or laptop computer) executing software routines corresponding to these functional blocks. The program instructions themselves also may be provided in a storage system, such as an electrical, optical or magnetic storage medium, and executed by a processor of the computer system. The principles of the present invention find application in hybrid systems of mixed hardware and software designs.

The order of the steps as described above with reference to FIGS. 3-4 does not necessarily limit the order of operations for estimating noise.

Although primarily described with reference to a video encoding system, the above described methods may be applicable to the capture of video and still images that may directly be stored in a memory system and not coded for compression. Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The machine readable storage media may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method for reducing noise of a camera, comprising:
   receiving a video frame;
   acquiring camera settings for the frame;
   selecting a predefined noise profile based on the settings, wherein the noise profile includes an associated color range;
   identifying regions in the frame that match the color range of the noise profile;
   filtering the identified regions with a filter associated with the noise profile; and
   coding the frame with a predictive coding technique.

2. The method of claim 1, wherein the filter is a band pass filter.

3. The method of claim 1, wherein the filter is a finite impulse response filter.

4. The method of claim 1, wherein the filter is an infinite impulse response filter.

5. The method of claim 1, wherein the settings include white balance.

6. The method of claim 1, wherein the settings include image light conditions.

7. The method of claim 1, wherein when the settings indicate that the frame was captured in a low light condition, the method further comprises:
   analyzing the frame temporally and spatially to verify a presence of noise in the identified regions.

8. The method of claim 1, wherein the filtering uses a spatial and temporal pixel based filter accounting for luminance differences.

9. The method of claim 8, wherein the identified regions are further filtered in groups of pixels or blocks subsequent to the luminance filtering.

10. The method of claim 1, wherein the filtering uses camera motion to determine noise regions.

11. The method of claim 1, wherein the filtering uses statistics to determine noise regions.

12. The method of claim 1, wherein the filtering uses the signal to noise ratio to determine whether a region constitutes noise.

13. A video coding method for analyzing noise in a camera, comprising:
   receiving a video frame;
   acquiring camera settings for the frame;
   for frames captured in low light:
      identify regions of the frame that match a color range associated with a noise profile selected based on the settings;
      analyze the frame temporally and spatially to verify a presence of noise in the identified regions; and
      select a filter associated with the noise profile;
   for frames captured in regular light, or having no regions matching the color range, encode the frame in a standard fashion; and
   for frames with identified regions in which the noise was verified as present, first filter with the selected filter and then encode the frame.

14. The method of claim 13, wherein the color range is specified as a frequency band, and wherein the identifying includes identifying frequency bands in the frame that match the frequency band of the color range.

15. The method of claim 14, further comprising identifying regions with higher frequencies as containing noise and lower frequencies as containing objects.

16. The method of claim 13, wherein the spatial analysis includes comparing pixels to neighboring pixels to see whether colors are consistent.

17. The method of claim 13, wherein the spatial analysis includes use of edge detection.

18. The method of claim 13, wherein the temporal analysis includes recognizing color which is consistent across multiple frames as an object.

19. The method of claim 13, wherein the temporal analysis includes use of edge detection.

20. The method of claim 13, wherein the filtering uses a spatial and temporal pixel based filter accounting for luminance differences.

21. The method of claim 20, wherein the filtering further comprises filtering in groups of pixels or blocks subsequent to the luminance filtering.

22. The method of claim 13, wherein the analysis step uses camera motion to verify the presence of noise.

23. The method of claim 13, wherein the analysis step uses statistics to verify the presence of noise.

24. The method of claim 13, wherein the analysis step uses the signal to noise ratio to verify the presence of noise.

25. A non-transitory computer readable storage device, storing program instructions that when executed cause an executing device to perform a method for video coding, the method comprising:
   receiving a video frame;
   acquiring camera settings for the frame;

identifying regions of the frame that match a color range associated with a noise profile selected based on the settings;

verifying that the identified regions contain noise;

coding the frame under standard processing if no identified region was verified as having noise; and coding the frame by first filtering identified regions verified as having noise with a filter associated with the noise profile, for frames where identified regions were verified as having noise.

26. A non-transitory computer readable storage device, storing program instructions that when executed cause an executing device to perform a method for video coding, the method comprising:

receiving a video frame;

acquiring camera settings for the frame;

for frames acquired in low light:
identify regions of the frame that match a color range associated with a noise profile selected based on the settings;
analyze the frame temporally and spatially to verify a presence of noise in the identified regions; and
select a filter associated with the noise profile;

for frames in regular light, or having no identified regions in which noise was verified as present, encode the frame in a standard fashion; and for frames with identified regions in which noise was verified as present, first filter with the selected filter and then encode the frame.

27. A video coding system, comprising:

a camera to take pictures;

a settings configuration module to set and retrieve camera settings;

a pre-processor configured to:
receive a video frame;
acquire camera settings for the frame from the configuration module;
select a predefined noise profile based on the settings, wherein the noise profile includes an associated color range;
identify regions in the frame that match the color range of the noise profile; and
verify that the identified regions contain noise; and a coder configured to:
code the frame under standard processing if no identified region was verified as having noise; and
code the frame by first filtering identified regions verified as having noise with a filter associated with the noise profile, for frames where identified regions were verified as having noise.

28. A video coding method comprising:

receiving a video frame;

acquiring camera settings used while the frame was shot;

applying a pixel level adaptive filter spatially, based on luminance differences between individual pixels and their spatially neighboring pixels;

applying a pixel level adaptive filter temporally, based on luminance differences between individual pixels and their temporally neighboring pixels;

after the pixel level adaptive filters have been applied, applying a patch based adaptive filter, wherein the patch filter is applied to noise-containing pixels that have been filtered by the pixel level adaptive filters;

modifying the patch filtering based on results of its application;

updating the video frame based on results from the filters; and coding the video frame.

29. The method of claim 28, wherein the temporal filter is an infinite impulse response filter which uses a window for searching.

30. The method of claim 28, wherein the temporal filter is a finite impulse response filter which uses a window for searching.

31. The method of claim 28, wherein the patch filtering accounts for edge metrics.

32. The method of claim 28, wherein the patch filtering accounts for variance.

33. The method of claim 28, wherein the patch filtering accounts for luma mean differences.

34. The method of claim 28, wherein the patch filtering accounts for chroma mean differences.

35. The method of claim 28, wherein the patch filtering calculates ratios of variances between patches and multiplies by a combination of luma and chroma mean differences.

36. The method of claim 28, wherein the patch filtering application accounts for white balance, exposure, signal to noise ratio, or image analysis.

37. The method of claim 28, wherein the patch filtering application accounts for exposure.

38. The method of claim 28, wherein the patch filtering application accounts for signal to noise ratio.

39. The method of claim 28, wherein the pixel filtering accounts for camera motion using gyroscope information retrieved from the camera settings.

40. The method of claim 28, wherein the pixel filtering accounts for camera motion using accelerometer information retrieved from the camera settings.

* * * * *